United States Patent
Dachepalli et al.

(10) Patent No.: US 11,769,135 B1
(45) Date of Patent: Sep. 26, 2023

(54) GLOBAL CACHE TOOL SYSTEMS AND METHODS FOR ADDING NEW PAYEES

(71) Applicant: Wells Fargo Bank, N.A., San Francisco, CA (US)

(72) Inventors: Sabitha Dachepalli, Dublin, CA (US); Remo DeLeon, American Canyon, CA (US); Peter Rozovski, Concord, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/897,013

(22) Filed: Aug. 26, 2022

Related U.S. Application Data

(63) Continuation of application No. 16/206,401, filed on Nov. 30, 2018, now Pat. No. 11,455,613, which is a continuation of application No. 14/570,419, filed on Dec. 15, 2014, now Pat. No. 10,210,499.

(51) Int. Cl.
G06Q 40/00 (2023.01)
G06Q 20/32 (2012.01)
G06F 16/21 (2019.01)

(52) U.S. Cl.
CPC ....... *G06Q 20/3223* (2013.01); *G06F 16/219* (2019.01)

(58) Field of Classification Search
CPC .................................................. G06Q 20/3223
USPC ........................................................ 705/40
See application file for complete search history.

(56) References Cited

U.S. PATENT DOCUMENTS

| | | | |
|---|---|---|---|
| 7,395,243 B1 | 7/2008 | Zielke et al. | |
| 7,526,448 B2 * | 4/2009 | Zielke ................. | G06Q 20/102 705/40 |
| 7,606,787 B2 | 10/2009 | Keown et al. | |
| 7,792,749 B2 | 9/2010 | Ganesan | |
| 7,813,983 B2 | 10/2010 | Wottowa et al. | |
| 8,433,654 B2 | 4/2013 | Subbarao et al. | |
| 8,484,104 B1 | 7/2013 | Hurlbutt et al. | |
| 8,688,573 B1 | 4/2014 | Rukonic et al. | |
| 8,725,632 B2 | 5/2014 | Tompkins et al. | |
| 2004/0088251 A1 | 5/2004 | Moenickheim et al. | |
| 2004/0221089 A1 | 11/2004 | Sato et al. | |
| 2007/0282743 A1 * | 12/2007 | Lovelett ................ | G06Q 20/10 705/40 |
| 2008/0006685 A1 * | 1/2008 | Rackley, III .......... | G06Q 40/00 235/379 |
| 2008/0065531 A1 | 3/2008 | Smith et al. | |

(Continued)

OTHER PUBLICATIONS

IEEE Xplore ; Wireless Wallet; Author Labrou, Agre, Molina and Chen. ISBN-0-7695-2208-4 (Year: 2004).*

(Continued)

*Primary Examiner* — Bruce I Ebersman
*Assistant Examiner* — John A Anderson
(74) *Attorney, Agent, or Firm* — Foley & Lardner LLP

(57) ABSTRACT

Systems and methods for preparing payment requests via cached payee information databases are described. The cached payee database system allows customers to search locally stored payee databases on their mobile devices for payee information. The cached version of the payee database is updated with updated payee information. The cached database system can perform payee searches on a character-by-character basis in real time with minimal delays between searches.

14 Claims, 4 Drawing Sheets

(56) References Cited

U.S. PATENT DOCUMENTS

| | | |
|---|---|---|
| 2010/0306094 A1 | 12/2010 | Homer et al. |
| 2011/0125644 A1 | 5/2011 | Fleishman et al. |
| 2011/0258083 A1* | 10/2011 | Ren .................... G06Q 30/0641 |
| | | 705/27.1 |
| 2012/0030215 A1* | 2/2012 | Herron ................ G06F 16/7867 |
| | | 707/748 |
| 2013/0054452 A1 | 2/2013 | Au et al. |

OTHER PUBLICATIONS

A wireless payment system Published in: Second International Conference on Embedded Software and Systems (ICESS'05) (pp. 8 pp.) Authors: J. Gao • J. Cai • K. Patel • S. Shim (Year: 2005).*

ANZ Bank New Zealand Limited, Internet Banking Help—Add a New Payee, 2014, retrieved from the internet at: https://apps.anz.co.nz/internet-banking-help/add-new-payee.aspx on Jul. 21, 2014, 2 pages.

Barclays Mobile Banking, (n.d.) webpage retrieved from the internet at: http://gh.barclays.com/mobile-banking/index.html on Aug. 6, 2014, 1 page.

Connexus Credit Union, Announcing a New Time-Saving Bill Pay Feature, Dec. 14, 2010, retrieved from the internet at: https://connexuscu.wordpress.com/2010/12/14/announcing-a-new-time-saving-bill-pay-feature/ on Aug. 27, 2014, 3 pages.

Fifth Third Bank, Adding Payees informational page, 2014, retrieved from the internet at: https://www.53.com/help/adding-payees.html on Jul. 21, 2014, 2 pages.

IntegraSys Launches Innovative, Full-Service Business Banking Solution for Credit Unions Publication info: Business Wire [New York] Jul. 14, 2004: 1 (Year 2004).

Intuit, Memorized Payee List, Quicken Support (online Article ID: GEN82166) updated May 8, 2012, retrieved from the internet at: http://quicken.intuit.com/support/help/income-and-expenses/memorized-payee-list/GEN82166.html on Jul. 21, 2014, 2 pages.

National Australian Bank Internet Banking webpage, (n.d.) retrieved from the internet at: http://www.nab.com.au/personal/internet-banking/nab-internet-banking-on-your-mobile on Aug. 6, 2014, 1 page.

* cited by examiner

GLOBAL CACHE TOOL SYSTEMS AND METHODS FOR ADDING NEW PAYEES

CROSS REFERENCE TO RELATED APPLICATION

This application is a continuation of U.S. patent application Ser. No. 16/206,401, filed Nov. 30, 2018, which is a continuation of U.S. patent application Ser. No. 14/570,419, filed Dec. 15, 2014, now U.S. Pat. No. 10,210,499, each of which are hereby incorporated by reference in their entirety.

FIELD

The present disclosure generally relates to online payment systems using mobile devices.

BACKGROUND

With the growing prevalence of smartphones, tablets, and other compact mobile computing devices, many financial institutions have developed mobile banking software applications for their customers. These software applications offer convenient ways for customers to perform increasingly complex banking transactions on their mobile devices. In turn, these software applications lower costs to financial institutions by reducing customer load on brick and mortar banking establishments. By their compact nature, however, mobile devices possess limited hardware and networking capabilities relative to their desktop and laptop counterparts. Maximizing the efficiency and ease of use of such mobile banking applications is therefore an important priority for financial institutions in encouraging customers to use them.

SUMMARY

One embodiment relates to a financial institution computing system. The system includes a payee database, a network interface logic; and a payee database logic. The payee database logic is configured to maintain the payee database. The payee database logic is further configured to transmit a cache version of the payee database through the network interface logic. The payee database logic is configured to receive a plurality of customer payment requests through the network interface logic wherein at least one payment request includes an intended payee selected by a customer from the cache version of the payee database on a customer device.

Another embodiment relates to a computer-implemented method. The method includes maintaining, by a payee database logic, a payee database having a plurality of profiles of payee information associated with a plurality of payees. The method further includes providing, by a financial institution, a customer device application that enables customers to search a cache version of the payee database and to transmit payment requests to the financial institution. The method includes transmitting, by a payee database logic through a network interface logic, a cache version of the payee database to a plurality of customer devices. The method further includes receiving, by the payee database logic through the network interface logic, a plurality of customer payment requests from the plurality of customer devices, wherein at least one payment request includes an intended payee selected by a customer from the cache version of the payee database on the customer's device.

An additional embodiment relates to a non-transitory computer readable media having computer-executable instructions embodied therein that, when executed by a payee database logic of a financial institution computing system, cause the financial institution computing system to perform operations. The operations include maintain a payee database having a plurality of profiles of payee information associated with a plurality of payees. The operations further include transmit a cache version of the payee database to a plurality of customer devices through a network interface logic. The operations include receive a plurality of customer payment requests through the network interface logic wherein at least one payment request includes an intended payee selected by a customer from the cache version of the payee database on the customer's device.

These and other features, together with the organization and manner of operation thereof, will become apparent from the following detailed description when taken in conjunction with the accompanying drawings.

DETAILED DESCRIPTION

Referring to the figures generally, systems and methods for preparing customer payment requests from customer mobile devices are described. A system and method for locally caching a financial institution's database of payee information on customers' mobile devices allows the financial institution's customers to quickly and accurately search for payees on their mobile devices. When a customer searches for a payee by entering the name of the payee into the customer's mobile device, the customer's mobile device populates a listing of possible payee matches by searching the locally cached database of payee information as each character of the intended payee's name is entered by the customer. By locally caching the database on the customer's mobile device instead of sending queries to a remote payee database over a network, search results are returned to the customer with minimal delay such that searches can be smoothly run in real time as customers enter each character into a search string. The speed with which the payee list is updated on the device display may therefore keep up with the speed of data entry on the device keyboard. After a handful characters, the customer can select the desired payee from the search results and the payee's information in the database will then be used to process the payment request. If there are too many search results, the customer can continue typing in characters until the intended payee appears. If the customer's desired payee is ultimately not found in the cached database, the customer can enter the payee's full payment information, which can then be used to update the payee database for future use.

Figure 1:
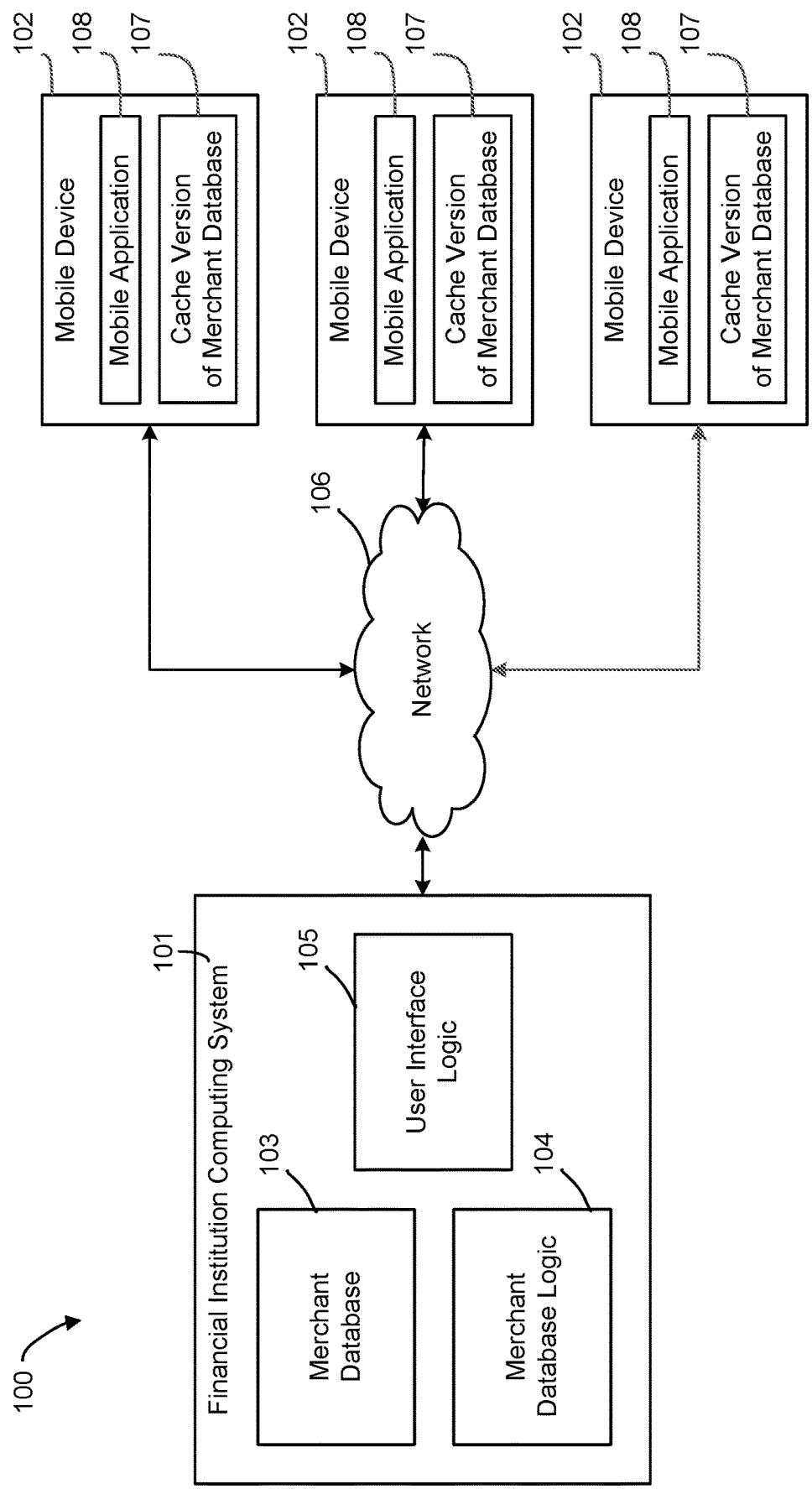
FIG. 1 is a schematic diagram of a computer-implemented customer payment request generating system according to an example embodiment.

Referring to FIG. 1, a schematic diagram of a computer-implemented payment request preparation system 100 is shown according to an example embodiment. System 100 provides banking services to customers of a financial institution, including payment issuing services, via a financial institution computing system 101 and mobile applications 108 installed on customer mobile devices 102. Customers may be business entities and/or individual persons having one or more accounts with the financial institution. Payees may be business entities or individual persons. In some arrangements, a payee is an account holder with the financial institution. In other arrangements, a payee is not an account holder with the financial institution. The financial institution is a banking entity capable of issuing payments from customer accounts maintained by the financial institution to payees. The financial institution may be a commercial or private bank, a credit union, or an investment brokerage. Mobile applications 108 refer to software programs designed to operate on customer mobile devices 102. Mobile devices 102 are portable computing devices that are capable of wirelessly accessing various types of data networks, and include smartphones, tablets, PDAs, and the like. The relationships between these various aspects of system 100 are described in further detail below.

Still referring to FIG. 1, the financial institution computing system 101 includes a payee database 103, payee database logic 104, and network interface logic 105. The payee database 103 contains profiles of information for a plurality of payees, including, for example, each payee's full legal name, aliases, previous names, phone numbers, financial account information, and business addresses. The payee database logic 104 maintains the payee database 103 and updates the payee database 103 with corrected profile information (e.g., new addresses, new aliases), and/or altogether new payee profiles. In some arrangements, the payee database logic 104 is executed by a processor (e.g., a processor of a backend server of the financial institution computing system 101). A network interface logic 105 allows the financial institution computing system 101 to communicate with customer mobile devices 102 over a network 106. The network interface logic 105 may include network hardware, such as an Ethernet controller, that allows the financial institution computing system 101 to send and receive data over the network 106. The financial institution computing system 101 uses the network interface logic 105 to transmit the payee database 103 and updates to the payee database 103 to customer mobile devices 102 over a network 106, and to receive payment requests to payees from customer mobile devices 102. The network 106 may include wireless networks (e.g., cellular networks, Bluetooth, WiFi, Zigbee, etc.), wired networks (e.g., Ethernet, DSL, cable, fiber-based), or a combination thereof. In some arrangements, the network 106 includes the internet. Although shown as being part of the financial institution computing system 101, in some arrangements, the payee database 103 is maintained by a third-party provider in communication with the financial institution computing system 101 via the network 106.

Still referring to FIG. 1, each customer mobile device 102 includes a cache version of the payee database 107. The cache version of the payee database 107 is stored in the mobile device's local storage (e.g., integrated flash memory drives, SD cards, or other permanent or removable storage drives), and reflects the information contained in the payee database 103 in the financial institution computing system 101. The cache version of the payee database 107 is created based on information from the payee database 103. In some arrangements, the cache version of the payee database 107 is a condensed version of the payee database 103. For example, the cache version of the payee database 107 can be configured to include less than all of the payee information in the payee database 103 (i.e., only a subset thereof, such as payee addresses only), and/or can be configured to include information in the payee database 103 in an abbreviated format. For example, whereas information concerning the payees stored in the database 103 may include the payee's name, aliases, previous names, phone numbers, addresses, financial account information, and the like, the cache version of the payee database 107 may omit some of this information. The cache version of the payee database 107 is transmitted from the financial institution computing system 101 to the mobile devices 102 through the network 106.

The cache version of the payee database 107 is periodically updated to reflect new information in the payee database 103 in the financial institution computing system 101. After new or corrected information is added to the payee database 103, the payee database logic 104 sends an update to the mobile devices 102 via the network interface logic 105. The update transmissions can be scheduled in several ways, for example, at predetermined time intervals (e.g., every twenty minutes), at the discretion of the financial institution (i.e., on command), or on a continuous basis as the payee database 103 itself is updated. The cache version of the payee database 107 can be updated via a full replacement of the cache version of the payee database 107 with information from the latest version of the payee database 103, or by discrete corrections, additions, and deletions to payee profile information on the existing copy of the cache version of the payee database 107.

Still referring to FIG. 1, customer mobile devices 102 also include a mobile application 108, which is provided by the financial institution. The mobile application 108 can be provided, for example, in the form of an "app" that customers can download from third-party vendors such as the Apple App Store™ or Google Play™, or in the form of a mobile version of the financial institution's website. The mobile application 108 includes a graphical user interface that allows customers to perform banking functions through the financial institution computing system 101. These banking functions include, for example, account balance inquiries, balance transfers, and requests for payments to identified payees. In performing these functions, the mobile application 108 interfaces with a customer, the customer mobile device 102 itself, and the financial institution computing system 101.

Figure 2A:
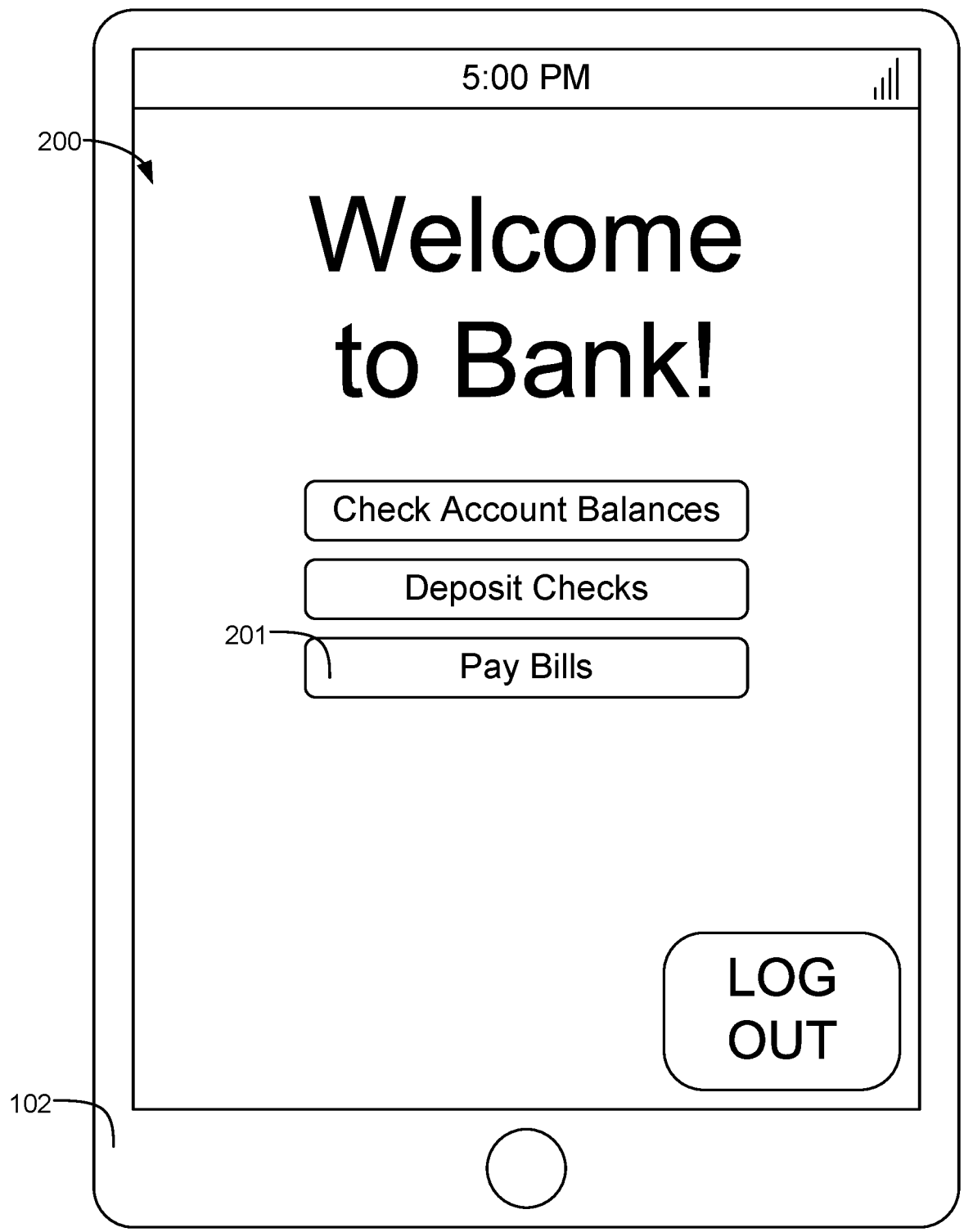
FIGS. 2A and 2B are schematic diagrams of a mobile device banking application according to an example embodiment.

Referring to FIG. 2A, an example interactive graphical user interface 200 of the mobile application 108 as viewed on a customer mobile device 102 is shown according to an example embodiment. The user interface 200 in FIG. 2A initially displays a welcome screen of the mobile application 108. A customer can interact with the user interface 200 to perform various banking functions, including paying bills by interacting with the "Pay Bills" button 201 of the user interface 200. When a customer selects the "Pay Bills" button 201, the application 108 updates the user interface 200 to allow the customer to enter payee information (e.g., as shown in FIG. 2B).

Figure 2B:
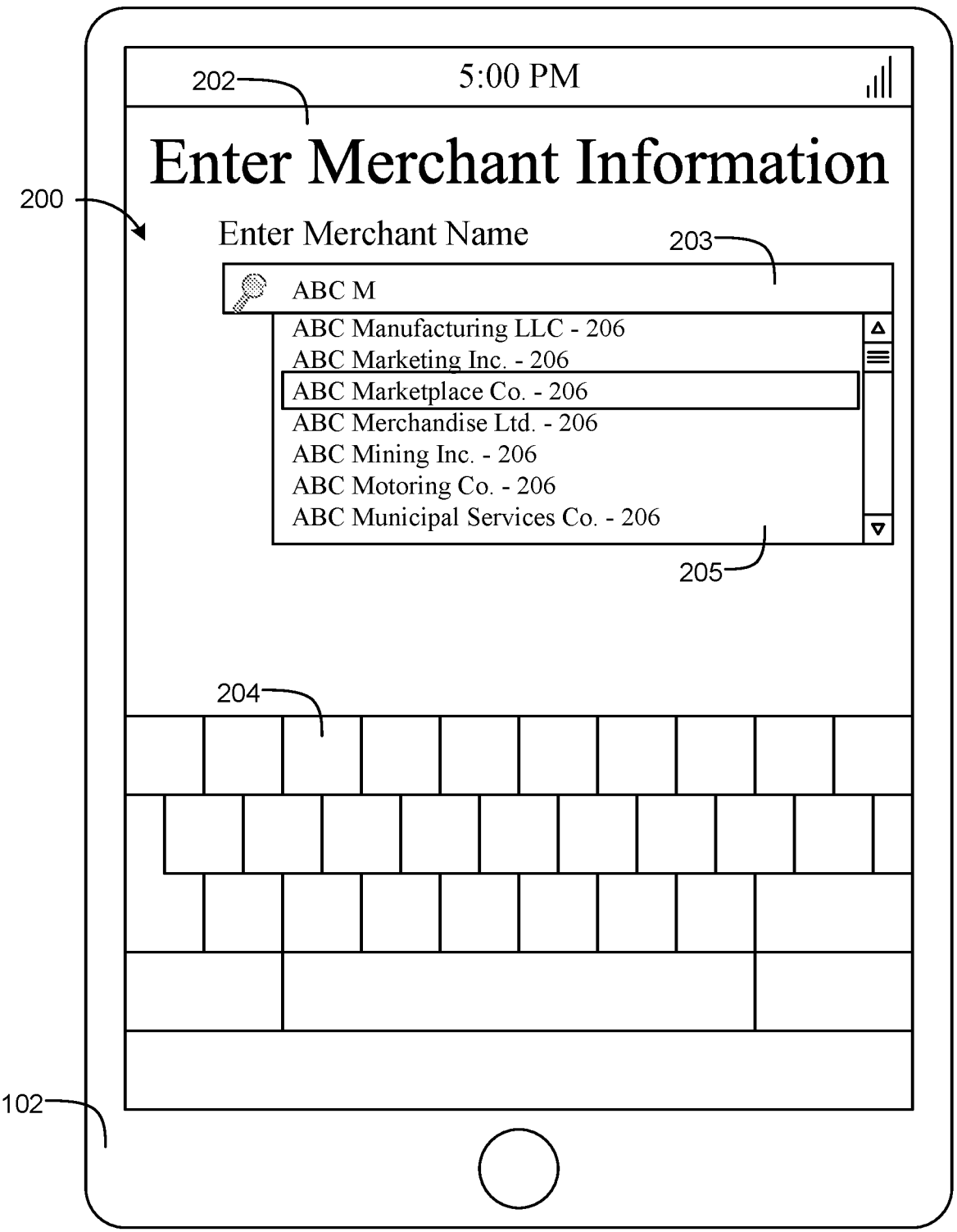

Referring to FIG. 2B, the user interface 200 of FIG. 2A has been updated after the customer interacted with the "Pay Bills" button 201 to an "Enter Payee Information" page 202. Through the user interface 200, a customer can begin providing payee information (i.e., information relating to the intended recipient of funds from the customer's account) to the mobile application 108. As shown in FIG. 29, the customer can start typing the intended payee into the search query box 203 by interacting with the user interface (e.g., by typing on a keyboard 204 of the mobile device 102).

Still referring to FIG. 2B, based on the characters entered by the customer into the search query box 203, the mobile application 108 will search the cache version of the payee database 107 for payee profiles containing matching payee information. Based on the search results, the mobile application 108 updates a drop down list 205 of possible matching payees 206. The mobile application 108 repeatedly updates the search of the cache version of the payee database 107 and the identified payees in the drop down list 205 with each keystroke of the customer on the mobile keyboard 204. Accordingly, if the customer's intended payee appears in the drop down list 205, the customer can select the intended payee without typing the full payee name, and the mobile application 108 can prepare the customer's payment to the intended payee using the information in the corresponding payee profile in the cache version of the payee database 107. If the customer's intended payee does not appear in the drop down list 205, or if the drop down list 205 is too long, the customer can keep typing additional characters of the intended payee's name into the search query box 203 until the payee appears. In some situations, the customer's intended payee is not contained in the cache version of the payee database 107, and will therefore not appear in the drop down list 205 even after the customer enters the intended payee's full name. In these situations, the customer can add a new payee profile as described in further detail below.

The mobile application 108 can be configured such that it does not begin searching the cache version of the payee database 107 until the customer has entered a minimum number of characters (e.g., at least four characters of a search string) into the search query box. Configuring the mobile application 108 to require a minimum number of characters before searching the cache version of the payee database 107 can increase the efficiency of the payee selection process. If the mobile application 108 searches the cache version of the payee database 107 after the customer has entered only a single letter into the search query box 203, such a search would likely return a large number of irrelevant results and demand excessive processing power from the customer mobile device 102. These initial searches are therefore unlikely to be useful, and the delays caused by the initial searches' demand on the mobile device's processing power will be inconvenient for the customer. By configuring the mobile application 108 to require some minimum number of characters (i.e., greater than one character) before the mobile application 108 begins searching the cache version of the payee database 107, the likelihood of returning relevant results is increased, and the mobile application's demand on the mobile device's processing power is reduced. As a result, the mobile application 108 can operate more smoothly and provide the customer with more accurate search results.

The mobile application 108 can also be configured to incorporate a customer's account information to sort or refine matching payees in the drop down list 205. For example, a customer's account information can include that customer's name, addresses, phone numbers, and payment history. The customer account information can also include the customer's demographic information, such as age, gender, ethnicity, and income. Each of these pieces of customer information can be used to categorize payees based on customer behavior (e.g., previous payment requests submitted by the financial institution's customers) and increase search efficiency. For example, customer account information can be used to categorize popular payees by zip code or area code (as determined by previously submitted customer payment requests). After searching for the characters in the search query entry box 203, the mobile application 108 can further sort or refine the drop down list 205 by popular payees by zip code and/or area code.

If the customer's desired payee is not stored in the cache version of the payee database 107, the mobile application 108 will not find a matching payee profile. In this case, the customer can manually enter all of the payee's information required for payment (e.g., the payee's full name, address, etc.) into the mobile application 108. The mobile application 108 can save the new payee's information as a new payee profile, and transmit the new payee profile back to the financial institution computing system 101 along with the customer's payment request.

If the payee database logic 104 receives a payment request containing a new payee profile that the customer manually entered, the payee database logic 104 can determine whether the payee database 103 at the financial institution computing system 101 needs to be updated with the new payee profile. The payee database logic 104 can search for the new payee profile in the payee database 103. If the new payee profile does not exist in the payee database 103, the payee database logic 104 can add the new payee profile and include the new payee profile in the next transmitted update to customer mobile devices 102. If the new payee profile already exists in the payee database 103, the payee database logic 104 will not need to take any additional actions regarding the new payee profile.

The payee database 103 at the financial institution computing system 101 can also be updated by the financial institution itself. The financial institution can enter corrected or new payee profile information to the payee database logic 104 independently of whether new payee profiles or corrected payee information is received from customer mobile applications 108. The new and/or corrected payee profiles can then be transmitted to the customer mobile devices 102 as an update.

Figure 3:
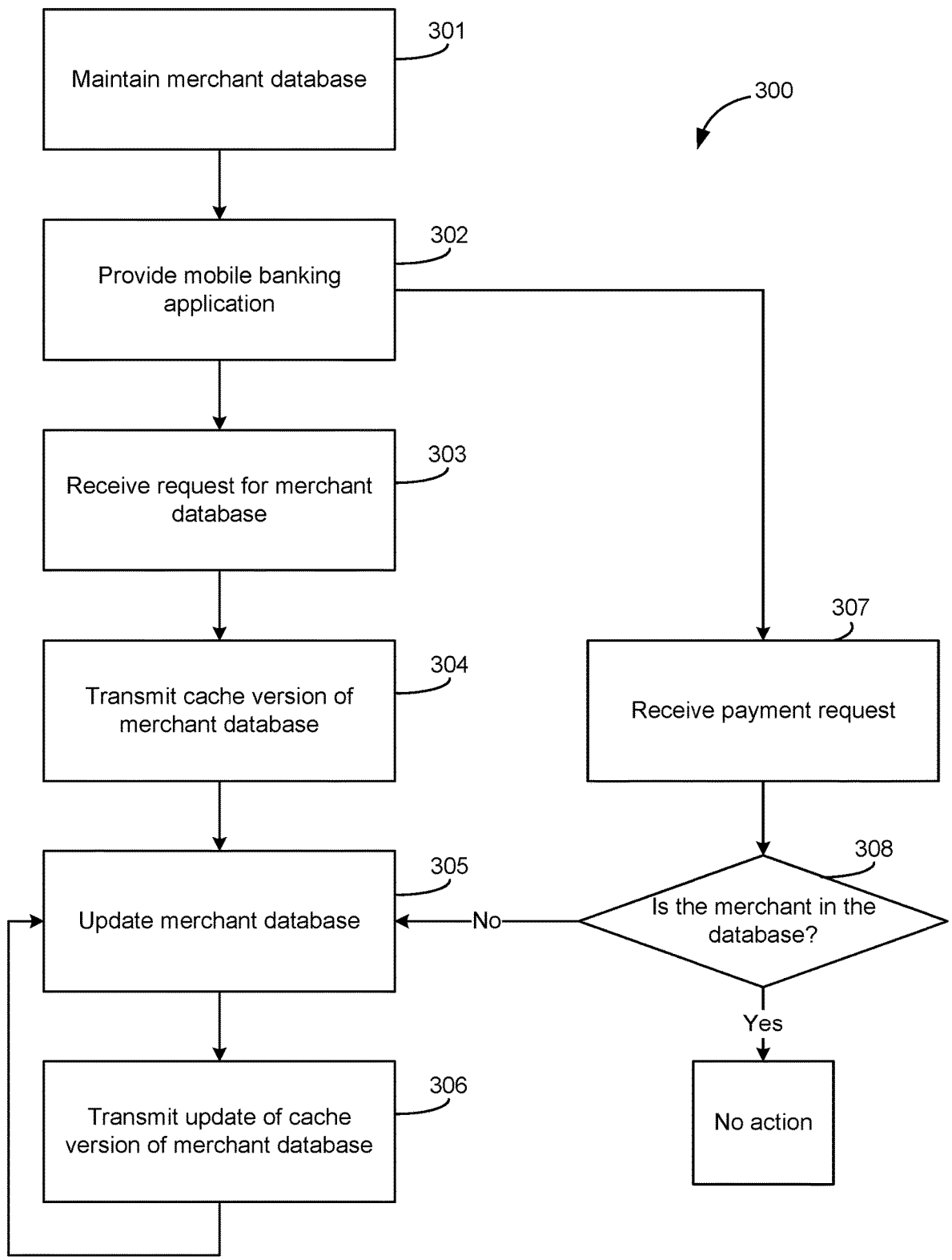
FIG. 3 is a flow diagram of a method of updating payee information databases according to an example embodiment.

Referring to FIG. 3, a flow diagram of a method 300 of updating payee information databases is shown according to an example embodiment. The method 300 is performed by a computer-implemented system of a financial institution (e.g., system 100), which provides a payment system that allows customers to use mobile devices (e.g., mobile devices 102) to identify payees and request the payment of funds to those payees from the customers' accounts. As discussed above with respect to system 100 and in further detail below with respect to method. 300, the financial institution's computing system (e.g., financial institution computing system 101) can be designed to operate with mobile software applications (e.g., mobile application 108) to allow customers to efficiently identify payees and prepare payment requests.

In method 300, a payee database is maintained by a financial institution computing system (301). The financial institution computing system maintains the payee database by storing the information within, and rendering it accessible for various banking operations, including processing payment requests. The payee database includes various types of payee information sufficient to identify and send payments to specific payees on behalf of the financial institution's customers, which are organized into payee profiles. The information in a given payee profile includes any of the payee's name, aliases, previous names, phone numbers, addresses, financial information, and the like. The payee profiles are stored as entries in the payee database, and are indexed such that the payee database is searchable by any of the types of information collected to identify specific payees.

A mobile application (e.g., mobile application 108) is provided by a financial institution to its customers (302). Mobile applications are software programs intended to be operated on mobile devices such as smartphones, tablets, and PDAs (e.g., customer mobile device 102). The mobile application is provided in the form of an "app", and can be distributed to customers through third party vendors such as the Apple App Store™ or Google Play™. Alternatively, the mobile application is provided as a "mobile" version of the financial institution's website accessed through web browsers of the customers' mobile computing devices. The mobile application provides an interface for the financial institution and a customer to exchange information over a data network (e.g., network 106) using the customer's mobile device (e.g., customer mobile device 102). Among various features, the mobile application allows customers to select payees and request the financial institution to issue payments to selected payees from customer accounts with the financial institution.

The mobile application is designed to receive and cache a local copy of the payee database from the financial institution computing system. The mobile application caches the payee database in the mobile device's local memory (e.g., integrated memory drives, SD cards, etc.). The mobile application can receive the payee database through any of several types of wired or wireless data networks (e.g., as described above with respect to network 106).

The mobile application is further designed to search and pull information from the cached copy of the payee database on the customer mobile device. As a customer enters each character into a search string presented by the mobile application, the mobile application searches the cache version of the payee database for payee profiles with matching information. The mobile application may be configured to only begin searching the cache version of the payee database after the customer has entered some minimum number of characters, to prevent the application from returning an undesirably large number of results.

After the mobile application is provided at 302, a request for a copy of the payee database is received (303). The request is sent by the mobile application over a network and is received by the financial institution computing system.

After the request is received at 303, a payee database is transmitted (304). The financial institution computing system transmits a copy of the payee database over a network to the customer's mobile device. In an alternative arrangement, the payee database can be bundled with the provided mobile application at 302. In such arrangements, the payee database is simultaneously transmitted with the mobile application.

After the payee database is transmitted, the payee database is updated (305). The financial institution computing system updates the payee database with any new payee profiles collected, and any corrections to the information in previously generated payee profiles. For example, payees may change addresses, take on new aliases, change their phone numbers, cease to exist, etc. Additionally, new payees may come into existence. The financial institution computing system updates the payee database at the financial institution to reflect this new information on a periodic, discretionary, or continuous basis.

After the payee database logic updates the payee database at 305, the payee database update is transmitted (306). The financial institution computing system transmits the payee database update over a network to all customer devices that have the mobile application installed. The financial institution computing system can transmit updates on a set periodic basis (e.g., every 20 minutes), upon demand at the discretion of the financial institution, or continuously as new or corrected information is added to the payee database at the financial institution. The updates can be transmitted as complete replacement payee databases, or as discrete additions or corrections to the cache version of the payee databases in customer devices.

The method can also update the payee database using information from customer payment requests. For such an arrangement, a payment request can be received (307) at any point after the mobile application is provided at 302. A customer mobile device can use the mobile application to send a payment request over a network, which is received by the financial institution computing system.

After a payment request is received at 307, the need for an update is determined (308). The financial institution computing system receives a customer payment request sent over a network, and then searches the payee database at the financial institution for the payee identified in the payment request. If the payee identified in the payment request does not exist in the payee database, the financial institution computing system can update the payee database with a new payee profile with the payee information from the payment request. The new payee profile can then be included in the next payee database update transmitted to customer mobile devices. If the new payee profile already exists on the payee database, the payee database logic will leave the payee database unmodified.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable or non-transitory storage media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of executable instructions or associated data structures represents examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system for preparing customer payment requests, the system comprising:
a payee database including payee profile information associated with a plurality of payees;
one or more processors; and
machine-executable data, that when executed by the one or more processors, causes the one or more processors to:
generate, by the one or more processors using the payee database, a first cache version of the payee database;
refine, by the one or more processors, matching payees to at least one popular payee category of a plurality of payee categories, wherein the refining comprises:
determining, by the one or more processors, the at least one popular payee category of the plurality of payee categories based on at least one previously submitted customer payment request;
categorizing, by the one or more processors, the at least one popular payee category by identifying at least one account having account information that matches account information of a current user;
receive, by the one or more processors, at least one payment request from the current user;
determine, by the one or more processors, that payee data associated with the at least one payment request is not included in the first cache version of the payee database;
generate, by the one or more processors using the payee database, a second cache version of the payee database, the second cache version of the payee database including the payee data; and
transmit, by the one or more processors via a network communicatively coupled to a customer mobile device of the current user, the second cache version of the payee database;
wherein at least one of the first cache version of the payee database and the second cache version of the payee database is configured to be searched only if a minimum quantity of one or both of letters and digits of payee information are entered into a search query; and
wherein at least one of the first cache version of the payee database and the second cache version of the payee database are configured to be searched based on at least one of a letter or a digit being entered into the search query that contains less than all of the payee profile information from the payee database.

2. The system of claim 1, wherein categorizing the at least one popular payee category is based on a zip code of the current user.

3. The system of claim 1, wherein the first cache version of the payee database contains less than all of the payee profile information from the payee database for at least some of the payees included in the first cache version of the payee database.

4. The system of claim 1, wherein the machine-executable data, when executed by the one or more processors, further causes the one or more processors to:
determine that the payee data associated with an intended payee of the received at least one payment request is not included in the payee database; and
update the payee database with the payee data.

5. A computer implemented method of maintaining an updated payee database, the method comprising:
- maintaining, by one or more processors, a payee database including payee profile information associated with a plurality of payees;
- generating, by the one or more processors using the payee database, a first cache version of the payee database;
- refining, by the one or more processors, matching payees to at least one popular payee category of a plurality of payee categories, wherein the refining comprises:
  - determining, by the one or more processors, the at least one popular payee category of the plurality of payee categories based on at least one previously submitted customer payment request;
  - categorizing, by the one or more processors, the at least one popular payee category by identifying at least one account having account information that matches account information of a current user;
- receiving, by the one or more processors, at least one payment request from the current user;
- determining, by the one or more processors, that payee data associated with the at least one payment request is not included in the first cache version of the payee database;
- generating, by the one or more processors using the payee database, a second cache version of the payee database, the second cache version of the payee database including the payee data; and
- transmitting, by the one or more processors via a network communicatively coupled to a customer mobile device of the current user, the second cache version of the payee database;
- wherein at least one of the first cache version of the payee database and the second cache version of the payee database is configured to be searched only if a minimum quantity of one or both of letters and digits of payee information are entered into a search query; and
- wherein at least one of the first cache version of the payee database and the second cache version of the payee database are configured to be searched based on at least one of a letter or a digit being entered into the search query that contains less than all of the payee profile information from the payee database.

6. The method of claim 5, wherein categorizing the at least one popular payee category is based on a zip code of the current user.

7. The method of claim 5, wherein the first cache version of the payee database contains less than all of the payee profile information from the payee database for at least some of the payees included in the first cache version of the payee database.

8. The method of claim 5, further comprising:
- determining that the payee data associated with an intended payee of the received at least one payment request is not included in the payee database; and
- updating the payee database with the payee data.

9. The method of claim 5, the at least one payment request being received from a first user and the second cache version of the payee database being transmitted to a second user different than the first user.

10. A non-transitory computer readable media having computer-executable instructions embodied therein that, when executed by one or more processors of a computing system, cause the one or more processors to:
- maintain a payee database including payee profile information associated with a plurality of payees;
- generate, using the payee database, a first cache version of the payee database;
- refine matching payees to at least one popular payee category of a plurality of payee categories, wherein the refining comprises:
  - determining the at least one popular payee category of the plurality of payee categories based on at least one previously submitted customer payment request;
  - categorizing the at least one popular payee category by identifying at least one account having account information that matches account information of a current user;
- receive at least one payment request from the current user;
- determine that payee data associated with the at least one payment request is not included in the first cache version of the payee database;
- generate, using the payee database, a second cache version of the payee database, the second cache version of the payee database including the payee data; and
- transmit, via a network communicatively coupled to a customer mobile device of the current user, the second cache version of the payee database;
- wherein at least one of the first cache version of the payee database and the second cache version of the payee database is configured to be searched only if a minimum quantity of one or both of letters and digits of payee information are entered into a search query; and
- wherein at least one of the first cache version of the payee database and the second cache version of the payee database are configured to be searched based on at least one of a letter or a digit being entered into the search query that contains less than all of the payee profile information from the payee database.

11. The media of claim 10, wherein categorizing the at least one popular payee category is based on a zip code of the current user.

12. The media of claim 10, wherein the first cache version of the payee database contains less than all of the payee profile information from the payee database for at least some of the payees included in the first cache version of the payee database.

13. The media of claim 10, wherein the first cache version of the payee database includes a first subset of the payee database and the second cache version of the payee database includes a second subset of the payee database, further wherein at least a portion of the payee database included in the first subset is not included in the second subset.

14. The media of claim 10, wherein the computer-executable instructions, when executed by the one or more processors, further causes the one or more processors to:
- determine that the payee data associated with an intended payee of the at least one received payment request is not included in the payee database; and
- update the payee database with the payee data.

* * * * *